US012017644B2

United States Patent
Hering et al.

(10) Patent No.: US 12,017,644 B2
(45) Date of Patent: Jun. 25, 2024

(54) MEASUREMENT DATA EVALUATION FOR VEHICLE-DYNAMICS SYSTEMS HAVING PROTECTION OF THE INTENDED FUNCTION

(71) Applicant: Robert Bosch GmbH, Stuttgart (DE)

(72) Inventors: Michael Hering, Leonberg (DE);
Bernd Mueller, Leonberg (DE);
Ingmar Berger, Muehlacker (DE)

(73) Assignee: ROBERT BOSCH GMBH, Stuttgart (DE)

( * ) Notice: Subject to any disclaimer, the term of this patent is extended or adjusted under 35 U.S.C. 154(b) by 221 days.

(21) Appl. No.: 17/419,201

(22) PCT Filed: Jan. 22, 2020

(86) PCT No.: PCT/EP2020/051477
§ 371 (c)(1),
(2) Date: Jun. 28, 2021

(87) PCT Pub. No.: WO2020/160901
PCT Pub. Date: Aug. 13, 2020

(65) Prior Publication Data
US 2022/0063601 A1 Mar. 3, 2022

(30) Foreign Application Priority Data
Feb. 6, 2019 (DE) .......................... 102019201491.7

(51) Int. Cl.
*B60W 30/08* (2012.01)
*B60W 30/18* (2012.01)
*B60W 40/105* (2012.01)

(52) U.S. Cl.
CPC ...... *B60W 30/08* (2013.01); *B60W 30/18109* (2013.01); *B60W 40/105* (2013.01)

(58) Field of Classification Search
CPC .......... B60W 30/08; B60W 30/18109; B60W 40/105; B60R 21/0134; G05B 19/0425
See application file for complete search history.

(56) References Cited

U.S. PATENT DOCUMENTS 6,360,592 B1 * 3/2002 Harris .................. B60T 17/221
73/121
9,855,935 B2 * 1/2018 Lee ......................... B60R 21/00
(Continued)

FOREIGN PATENT DOCUMENTS

CN 105774803 A 7/2016
CN 106458221 A 2/2017
(Continued)

OTHER PUBLICATIONS

International Search Report for PCT/EP2020/051477, Issued Jun. 30, 2020.

*Primary Examiner* — Khoi H Tran
*Assistant Examiner* — Trang Dang
(74) *Attorney, Agent, or Firm* — NORTON ROSE FULBRIGHT US LLP; Gerard A. Messina (57) ABSTRACT

A method for evaluating measurement data that are obtained by a plurality of sensors. The method includes: the measurement data originating from sensors of a first group are processed by a function evaluation module to form a function signal that, when it is supplied to a driving dynamics system of a vehicle, causes the driving dynamics system to carry out a driving task; the measurement data originating from a second group of sensors are processed by at least a first safety evaluation module to form a first safety signal that, when it is supplied to the driving dynamics system, causes the driving dynamics system to prevent a specified undesired event of the vehicle, the second group containing a proper subset of the first group; the function signal is
(Continued)

aggregated with the first safety signal to form a control signal that is capable of being outputted to the driving dynamics system.

15 Claims, 2 Drawing Sheets

(56) References Cited

U.S. PATENT DOCUMENTS

| | | | |
|---|---|---|---|
| 10,054,947 B2* | 8/2018 | Mays | B60W 30/00 |
| 11,235,760 B2* | 2/2022 | Otsuka | B60W 50/04 |
| 2019/0054917 A1* | 2/2019 | Sommer | B60K 28/10 |

FOREIGN PATENT DOCUMENTS

| | | | |
|---|---|---|---|
| CN | 106985780 A | 7/2017 | |
| CN | 107921960 A | 4/2018 | |
| CN | 108137054 A | 6/2018 | |
| CN | 108749818 A | 11/2018 | |
| DE | 10220811 B4 | 9/2016 | |
| EP | 1479581 A1 | 11/2004 | |

* cited by examiner

Fig. 2

MEASUREMENT DATA EVALUATION FOR VEHICLE-DYNAMICS SYSTEMS HAVING PROTECTION OF THE INTENDED FUNCTION

FIELD

The present invention relates to the evaluation of measurement data from the physical observation of a vehicle surrounding environment for further processing in the controlling of a driving dynamics system of the vehicle.

BACKGROUND INFORMATION

The safety of driving dynamics systems for vehicles that carry out specified driving tasks in completely or partly automated fashion is measured, inter alia, in the probability of the occurrence of undesired events. In the context of a client specification or an official permission specification, for example proof may be required that such probability is below a target value of, for example, $10^{-7}$/h. As the complexity of the driving dynamics system increases, it becomes increasingly more complicated to provide such proof.

German Patent No. DE 102 20 811 B4 describes that a safety-critical system that is to be monitored is subdivided in hierarchical fashion as a function of the complexity of the respective function that is to be carried out. In this way, the monitoring becomes clearer and easier to understand.

SUMMARY

In the context of the present invention, a method is provided for evaluating measurement data that are obtained by a plurality of sensors through physical observation of the surrounding environment, and/or of one or more operating states, of a vehicle. This evaluation is used for the purposes of a driving dynamics system that is designed to carry out at least one specified driving task by controlling at least one actuator of the vehicle in at least partly automated fashion.

In accordance with an example embodiment of the present invention, in this method, the measurement data originating from sensors of a first group are processed by a function evaluation module to form a function signal. This function signal is realized in such a way that when it is supplied to the driving dynamics system it causes the driving dynamics system to carry out the driving task.

The first group can include in particular for example all sensors present in the vehicle whose measurement data are relevant for carrying out the driving task. The driving task can for example be to automatically move the vehicle in congested traffic, for example in the context of a traffic jam pilot system that corresponds to level 3 of SAE norm J3016.

In accordance with an example embodiment of the present invention, the measurement data originating from sensors of a second group are processed at least by a first safety evaluation module to form a first safety signal. This safety signal is designed in such a way that when it is supplied to the driving dynamics system it causes the driving dynamics system to prevent a specified undesired event of the vehicle.

Here, the second group of sensors contains a proper subset of the first group. This means that there exists an intersection set of sensors that belong both to the first group and to the second group, but the second group does not coincide with the first group.

The undesired event to be prevented can advantageously be, for example, a frontal collision of the vehicle, a rear collision against the vehicle, and/or a departure of the vehicle from its lane, and/or a side collision. These events are primary causes of accidents.

With regard to the specific undesired event that is to be prevented, the second group can for example also contain additional sensors that are not contained in the first group. These sensors can for example be used to monitor the state of actuators or other driving systems that, given specific driving dynamics measures, are used to prevent the undesired event. Thus, for example in order to prevent a frontal collision it may become necessary to brake the vehicle. The safety evaluation module can then for example check whether the brakes are fully functional, or whether there are indications that the braking action is impaired. Such indications may be for example a low level of the brake fluid, a low pressure in the brake system, a high degree of wear of the brake pads, an increased water content in the brake fluid, or an increased temperature of the brake. If indications of possible impairment of the braking action are present, then the safety evaluation module can for example trigger a braking earlier than the function evaluation module, which operates on the basis of an observation of the traffic situation while assuming simultaneously fully functional brakes.

The function signal is aggregated with the safety signal or signals to form a control signal that can be outputted to the driving dynamics system. This aggregation can for example be designed in any desired manner in such a way that, in case of doubt, priority is given to safety.

It has been recognized that through the division of tasks between the function evaluation module and the safety evaluation module, a fundamental conflict of goals between the best possible availability and carrying out of the driving task, on the one hand, and ensuring safety on the other hand, is alleviated.

Improvements in the carrying out of the primary driving task frequently entail a higher degree of complexity of the evaluation of measurement data used for this driving task. In particular, such improvements are frequently achieved by taking into account measurement data from more sensors, and/or deriving more detailed information from the measurement data.

In the example mentioned above of the traffic jam pilot, it is for example desirable, in the interest of maximum driving comfort, for the trip to run as quietly and smoothly as possible. In addition, the vehicle should behave in a nonassertive manner so that a collision with one of the vehicles traveling in front is avoided, and so that the traffic behind is not held up more than is necessary. For example, if the vehicle reacts too late to a braking by the vehicle traveling in front and correspondingly has to brake strongly, a vehicle following the home vehicle may possibly not react to this until after the passing of the reaction time of a human driver, and must then brake even more strongly. This effect is passed in amplified form from vehicle to vehicle, until at some point all vehicles following have to brake to a standstill. This not only runs the risk of making an existing traffic jam worse: the minimal cause, in the form of the late, and therefore stronger, braking may even build up into a so-called "traffic jam out of nothing."

In order to counteract such effects, for example additional sensors or additional evaluation methods can be used, with the goal of recognizing an intention of the vehicle traveling in front as early as possible. In this way, however, it becomes increasingly more difficult to gain an overview of the probability of possible malfunctions. This is because malfunctions of the overall system may arise not only through malfunctions of the sensors or algorithms used in the narrow sense, but may also occur due to the occurrence of unexpected situations that place excessive demands on sensors that are functioning as intended. Thus, for example most cameras are overdriven when the sun low in the sky radiates directly onto the image sensor. Also, for example a pedestrian wearing a fur coat who crosses the roadway between vehicles stuck in congested traffic may not be timely recognized by an ultrasound sensor, because the fur coat absorbs the ultrasound waves. The probability of such unexpected situations increases with the number of sensors whose measurement data are used by the function evaluation module.

In accordance with an example embodiment of the present invention, the safety evaluation module can dedicate itself solely to the task of preventing a specified undesired event, independently of the complexity that is entailed by the specified driving task. Very frequently, the signals of significantly fewer sensors are enough for this, and the evaluation can correspondingly also be realized in a simpler manner. Frequently, a reduced region of observation is also sufficient. This means that the complexity of the safety evaluation module is decoupled from the complexity of the actual driving task. However, the simpler, in turn, the design of the safety evaluation module is, the easier it is to provide proof that the safety evaluation module permits the occurrence of the undesired event with no more than a specified probability. This proof can be provided in place of the proof that the substantially more complex function evaluation module heads off this undesired event.

In this way, an advantage achieved for the overall system, that the stated more easily provided proof for the safety evaluation module or modules, to make it possible to guarantee, overall, a specified maximum probability of the occurrence of the undesired event.

In a particularly advantageous embodiment of the present invention, in addition the measurement data originating from sensors of a third group are processed by a second safety evaluation module to form a second safety signal. This second safety signal is realized in such a way that when it is supplied to the driving dynamics system it causes the driving dynamics system to prevent a specified undesired event of the vehicle. Here the third group is different from the second group, i.e., does not coincide therewith.

For example, the first and the second safety evaluation module can be used to prevent one and the same undesired event. If for example the groups of sensors whose measurement data are used by the two safety evaluation modules are then disjoint, then the two safety evaluation modules are fully redundant between one another. A request for a maximum probability of the undesired event can then be fulfilled, or verified, with significantly lower outlay. Thus, given two fully redundant modules, the proof that each of the two modules, considered in itself, permits the occurrence of the undesired event only with a probability of $10^{-3.5}$/h is enough to make it possible to guarantee an overall probability of at most $10^{-7}$/h for the occurrence of the undesired event.

In accordance with an example embodiment of the present invention, the second, or a further, safety evaluation module can however also be used to prevent a different undesired event than the first safety evaluation module. This is advantageous in particular if the required maximum probabilities for the respective undesired events are different. Thus, for example for a frontal collision a probability of at most $10^{-7}$/h may be required, because such an accident is comparatively severe in its consequences, while for a rear collision against the vehicle, which frequently results only in damage to the car body, a probability of $10^{-5}$/h may be permissible. If a safety evaluation module is specialized in each case for the prevention of an undesired event, the proofs of the maximum probabilities that the respective undesired event will nonetheless occur can be decoupled from one another.

The approach of using a plurality of safety modules can however also be used to keep the complexity of the individual safety modules as low as possible, and thus comprehensible and manageable.

In a particularly advantageous embodiment of the present invention, the third group is disjoint from the second group. In this way, an individual malfunctioning sensor can particularly reliably be prevented from simultaneously influencing both safety signals.

In a particularly advantageous embodiment of the present invention, the aggregation includes a test of whether at least one driving dynamics intervention that takes place when the driving dynamics system is controlled with the safety signal or signals also takes place when the driving dynamics system is controlled with the function signal. If this is the case, then the proof is provided that, in the relevant situation, the function evaluation module is functioning correctly.

The function signal can then for example be sent directly to the driving dynamics system as control signal, so that the driving dynamics system can carry out the driving task in unhindered fashion.

If, on the other hand, in this test it is determined that a driving dynamics intervention does take place when the driving dynamics system is controlled with the safety signal or signals, but does not take place when the driving dynamics system is controlled with the function signal, this then indicates that the function evaluation module is not functioning correctly in the relevant situation, and does not recognize the threat of the occurrence of the undesired event. In this case, the control signal is influenced so that, when the driving dynamics system is controlled with the control signal, the driving dynamics intervention proposed according to the safety signal does in fact take place. This can happen for example in that, instead of the function signal, the safety signal is sent to the driving dynamics system as control signal. However, the control signal can also be influenced in some other way in such a way that the driving dynamics intervention takes place. For example, in response to the proposal of a particular driving dynamics intervention according to the safety signal, instead of the safety signal a signal curve specified for the triggering of this intervention can be superimposed on the control signal.

In this example embodiment, the role of the safety evaluation module or modules is comparable to the role of a driving teacher at an advanced level of driver's education. The driving student drives independently and under his own control most of the time, in order to progressively train his abilities. However, the driving teacher constantly observes whether the student has timely recognized a potentially dangerous situation and reacted appropriately thereto. If the student does not react, or if the student has not recognized the situation at all, for example by not looking at all into a street that has the right of way, then the driving teacher intervenes, usually by actuating the brake.

Alternatively or in combination therewith, the aggregation can contain a test of whether all items of information used for the determination of a driving dynamics intervention and present in the safety signal or signals are also present in the function signal. In this way, a still larger class of errors can be recognized. The function signal can for example be faulty in that while it does command a braking of the vehicle, for this purpose only the brakes on one side of the vehicle are used, while a controlling of the brakes on the other side is missing.

Correspondingly, in a further advantageous embodiment, in response to the determination that not all the items of information present in the safety signal or signals for the determination of a driving dynamics intervention are also present in the function signal, the control signal is influenced so that it contains all these items of information. In the controlling of the driving dynamics system with the control signal, all of the relevant items of information are thus taken into account. In the named example, this can mean for example that the control signal is supplemented with the missing controlling of the brakes on the other side of the vehicle.

The relevant items of information for determining a driving dynamic intervention can for example also include an evaluation of objects that occasion an initiation of the subsequently selected driving dynamic intervention. For example, in each case regions in the vehicle surrounding environment can be ascertained that are relevant to a possible collision and are not free of particular types of objects. This common denominator forms a particularly organic possibility for the aggregation.

As explained above, a situation in which the control signal is to be influenced in the described manner does not necessarily have to indicate a technical malfunction, but for example can also be triggered by an overloading of a sensor by an unexpected situation (such as the sun low in the sky, or an unknown constellation of traffic participants, or the behavior thereof). However, an accumulation of such situations can indicate that there is an error in the vehicle. For example, a sensor may be defective, dirty, or out of adjustment, or for example a connecting line may be interrupted. Therefore, in a further particularly advantageous embodiment the influencing of the control signal is noted in an event memory. In response to the circumstance that the number and/or the temporal sequence of the noted events satisfies a specified criterion, an error is outputted to an error memory of the vehicle.

The noting of the event and/or the outputting of the error to the error memory can in turn entail the bringing about of any desired measures in order to prompt the user of the vehicle to remedy the error. For example, an optical and/or acoustic warning device may indicate the error. However, for example the ability to accelerate, or other functions or parameters relevant for driving comfort, may also be limited, so that the user can still look for a repair shop with the vehicle under its own power, but further use of the vehicle without repair is impaired. At the highest level of escalation, possibly after a grace period of time or distance traveled, further travel, or restarting, of the vehicle is blocked. These and other measures for forcing repair bring it about that the vehicle is restored as soon as possible to a state in which the required safety levels for avoiding the specified undesired events are again present.

Alternatively, or in combination herewith, the event and/or the error can be communicated online to an evaluation center of the vehicle manufacturer, or to other locations, via a suitable connection. These locations can use the information for example for quality statistics or improvement.

In a further advantageous embodiment of the present invention, boundary conditions relating to the control signal are derived from the safety signal or signals, and the function signal can enter into the control signal in accordance with these boundary conditions. In this way, the safety evaluation module or modules can take part in a constant division of tasks with the function evaluation module.

Thus, for example a first safety evaluation module can specify that the vehicle is to be braked with a specified minimum deceleration in order to prevent a frontal collision of the vehicle. At the same time, for example a second safety evaluation module can specify that the vehicle is to be braked only up to a specified maximum deceleration so that a following vehicle will not run into it. In this way, there arises a corridor of possible deceleration values within which the function evaluation module can then act autonomously.

In a particularly advantageous embodiment of the present invention, both in the function evaluation module and also in at least one safety evaluation module, regions are respectively ascertained in the vehicle surrounding environment that are free of particular types of objects. This common denominator offers a particularly organic possibility for the aggregation. For example, with the control signal, only those regions that are recognized as free of the objects both by the function evaluation module and by all safety evaluation modules that are present can be reported to the driving dynamics system as available for driving.

Alternatively, or also in combination herewith, both in the function evaluation module and in at least one safety evaluation module regions can respectively be ascertained that are occupied by particular types of objects. Thus, for example it makes sense to drive past a ferry dock in the direction of water only when a ferry is present at the ferry dock.

In general, in a further particularly advantageous embodiment of the present invention, the control signal includes a spatial representation of the surrounding environment of the vehicle. For example, (only) objects in the collision-relevant region around the vehicle may be evaluated. This is also an organic common denominator that simplifies an aggregation. In this way, the spatial representation can for example be populated with the union set of all objects that are recognized by the function evaluation module and by all safety evaluation modules, in each case in the surrounding environment of the vehicle.

In a further particularly advantageous embodiment of the present invention, the second group and/or the third group contains at most a limited number of, for example, five sensors. In this way, the complexity of the safety evaluation module or modules remains in a range in which the proof that the undesired event will occur with at most the specified probability can still be produced without too much outlay.

In a further particularly advantageous embodiment of the present invention, in at least one safety evaluation module, in comparison to the function evaluation module:
 measurement data from a smaller spatial region are evaluated; and/or
 the measurement data are evaluated with regard to the presence of a limited class of objects; and/or
 objects recognized in the measurement data are evaluated in relation to a limited class of features.

It has been found that the measurement data supplied by a given physical sensor enable an evaluation with particularly high reliability
 up to a specified size of the observed spatial region, i.e. up to a specified lateral and/or longitudinal distance of the observed region from the sensor;
 up to a specified number of objects to be distinguished from one another; and/or
 up to a specified degree of detail of the evaluated features, while the reliability decreases beyond the respective boundary. The fact that the evaluation of the safety evaluation module or modules is now limited to that portion of the measurement data whose reliability is particularly high facilitates the proof that a safety evaluation module will permit the occurrence of the respective undesired event with only at most the required probability. At the same time, the function evaluation module can use the portions of the measurement data whose reliability is no longer quite as high in order to carry out the specified driving task. In this way, overall the best possible use is made of the capacities of the physical sensor.

The method can be carried out completely or partly on a computer and/or on a control device, but also for example on an embedded system that calls the data from the sensors via a CAN bus or another vehicle bus, and forwards the obtained control signal, for example via the same vehicle bus, to the driving dynamics system. The method can then be implemented in each case in software. This software brings about the immediate benefit to the client that, given a specified equipping of the vehicle with sensor hardware, more reliable statements can be made concerning probabilities with which undesired effects specified in the driving dynamics system of the vehicle occur. The software can be marketed for example as an update or upgrade to an existing computer, control device, or embedded system, and to that extent is an independent product. Therefore, the present invention also relates to a computer program having machine-readable instructions that, when they are carried out on one or more computers and/or one or more control devices and/or on one or more embedded systems cause the computer or computers, the control device or devices, and/or the embedded system or systems to carry out the described method. The present invention also relates to a machine-readable data carrier or a download product having the computer program.

In addition, the present invention relates to a computer, a control device, and/or an embedded system having the described computer program, machine-readable data carrier, and/or download product. Alternatively, or also in combination, the computer, the control device, or the embedded system can also, in any other manner desired, be specifically designed to carry out the described method. Such a specific design can for example be realized via field-programmable gate arrays (FPGAs) and/or application-specific integrated circuits (ASICs).

In the following, further measures that improve the present invention are presented together with the description of the preferred exemplary embodiments of the present invention, on the basis of Figures.

DETAILED DESCRIPTION OF EXAMPLE EMBODIMENTS

Figure 1:
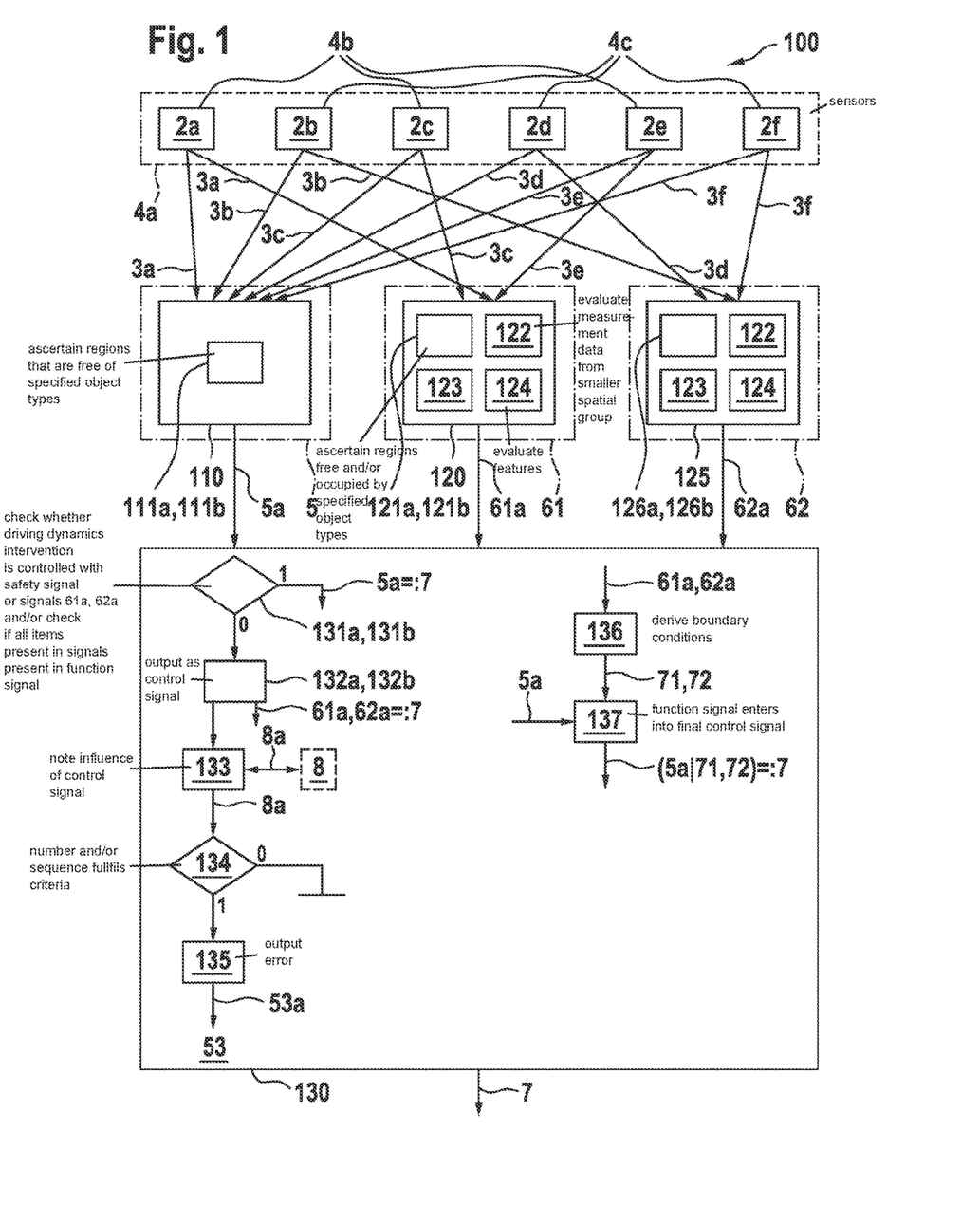
FIG. 1 shows an exemplary embodiment of the method 100, in accordance with the present invention.

According to FIG. 1, six sensors 2a-2f, shown as examples, each provide measurement data 3a-3f. According to step 110 of method 100, measurement data 3a-3f from the first group 4a of sensors 2a-2f, which here includes all sensors 2a-2f, are processed by a function evaluation model to form a function signal 5a that is provided for the controlling of a driving dynamics system 51 (not shown in FIG. 1) of a vehicle 50. Here, in particular according to block 111a, regions in the surrounding environment of vehicle 50 can be ascertained that are free of specified types of objects, such as other traffic participants or objects bounding the roadway. Alternatively, or also in combination, according to block 111b regions in the surrounding environment of vehicle 50 can be ascertained that are occupied by specified types of objects.

Function signal 5a is not forwarded indiscriminately to driving dynamics system 51. Instead, a first safety evaluation module 61 and a second safety evaluation module 62 are provided. In the example shown in FIG. 1, first safety evaluation module 61 receives the measurement data 3a, 3c, 3e of a second group 4b of sensors, which here includes sensors 2a, 2c, and 2e. From these, according to block 121a, in particular regions in the surrounding environment of vehicle 50 can be ascertained that are free of specified objects, and/or according to block 121b regions can be ascertained that are occupied by specified objects. Second safety evaluation module 62 receives measurement data 3b, 3d, 3f from a third group 4c of sensors that here includes sensors 2b, 2d, and 2f. From these, according to block 126a, in particular regions can in turn be ascertained in the surrounding environment of vehicle 50 that are free of specified objects, and/or according to block 126b regions can be ascertained that are occupied by specified objects. Here the two safety evaluation modules 61 and 62 can for example look for the same objects in the surrounding environment of vehicle 50, so that there is a certain degree of redundancy in the recognition. The two safety evaluation modules 61 and 62 can however also for example each be specialized for the recognition of different types of objects. Thus, for example module 61 can look for vehicles, and module 62 can look for pedestrians.

In comparison with function evaluation module 5, the two safety evaluation modules 61 and 62 can each
- evaluate measurement data 3a-3f from a smaller spatial region, according to block 122,
- search for a limited class of objects according to block 123, and/or
- evaluate the features of recognized objects in less detailed fashion, according to block 124.

In step 120, a first safety signal 61a is formed by first safety evaluation module 61. In step 125, second safety evaluation module 62 forms a second safety signal 62a. In step 130, function signal 5a, first safety signal 61a, and second safety signal 62a are aggregated to form the final control signal 7 for driving dynamics system 51 of vehicle 50.

Inside box 130, as an example two possibilities are shown of how the aggregation can take place.

According to a first possibility, in block 131a it is checked whether a driving dynamics intervention that takes place when driving dynamics system 51 is controlled with safety signal or signals 61a, 62a also takes place when driving dynamics system 51 is controlled with function signal 5a. Thus, specifically for example it can be checked whether function evaluation module 5 also recognizes a location, recognized according to safety signals 61a, 62a, at which vehicle 50 has to stop, and issues a function signal 5a that causes a corresponding braking of vehicle 50. Analogously, according to block 131b it can be checked whether all items of information for the determination of a driving dynamics intervention that are present in safety signals 61a, 62a are also present in function signal 5a.

If the respective test yields a positive result (truth value 1 in block 131a, 131b), then function signal 5a is usable from the standpoint of safety, and is outputted as control signal 7 to driving dynamics system 51. Otherwise (truth value 0), according to block 132a, 132b the corresponding safety signal 61a, 62a, which brings about the driving dynamic intervention or contains the complete information for its determination, is outputted as control signal 7. This can happen in particular when both tests 131a and 131b are carried out and of these only one test 131a, 131b is failed.

As explained above, safety evaluation modules 61, 62 perform something like the function of driving teachers that, in the normal case, allow function evaluation module 5 to act independently as "driving student," and intervene only in critical situations.

As explained above, even given technically correctly operating sensors 2a-2f and a technically correctly operating function evaluation module 5, situations can occur in which intervention with safety signals 61a, 62a is necessary. In order to distinguish the sporadic occurrence of such situations from systematic errors, such as sensor failures, according to block 133 the influence of control signal 7 is noted in an event memory 8. According to block 134, it is checked whether the number and/or the temporal sequence of the events 8a noted in event memory 8 fulfills a specified criterion, such as a constantly recurring necessity of the same type of intervention over a specified period of time. If this is the case (truth value 1), then according to block 135 an error 53a is outputted to an error memory 53 of vehicle 50. In this way, the user of vehicle 50 is prompted to attend to the problem.

According to a second possibility, in block 136 boundary conditions 71, 72 for the final control signal 7 are respectively derived from safety signals 61a, 62a. For example, first safety signal 61a can require a minimum value for a deceleration of vehicle 50 as first boundary condition 71, so that it does not run into a vehicle traveling in front. At the same time, second safety signal 62a can require a maximum value for the deceleration as second boundary condition 72, so that a streetcar approaching from behind does not run into vehicle 50. According to block 137, function signal 5a enters into final control signal 7 in accordance with the two boundary conditions 71, 72. In the named example, a deceleration requested according to function signal 5a that is between the minimum deceleration and the maximum deceleration can thus be sent directly into control signal 7. If the requested deceleration is below the minimum deceleration, control signal 7 is correspondingly set to the minimum deceleration. If the requested deceleration is greater than the maximum deceleration, control signal 7 is correspondingly set to the maximum deceleration.

Figure 2:
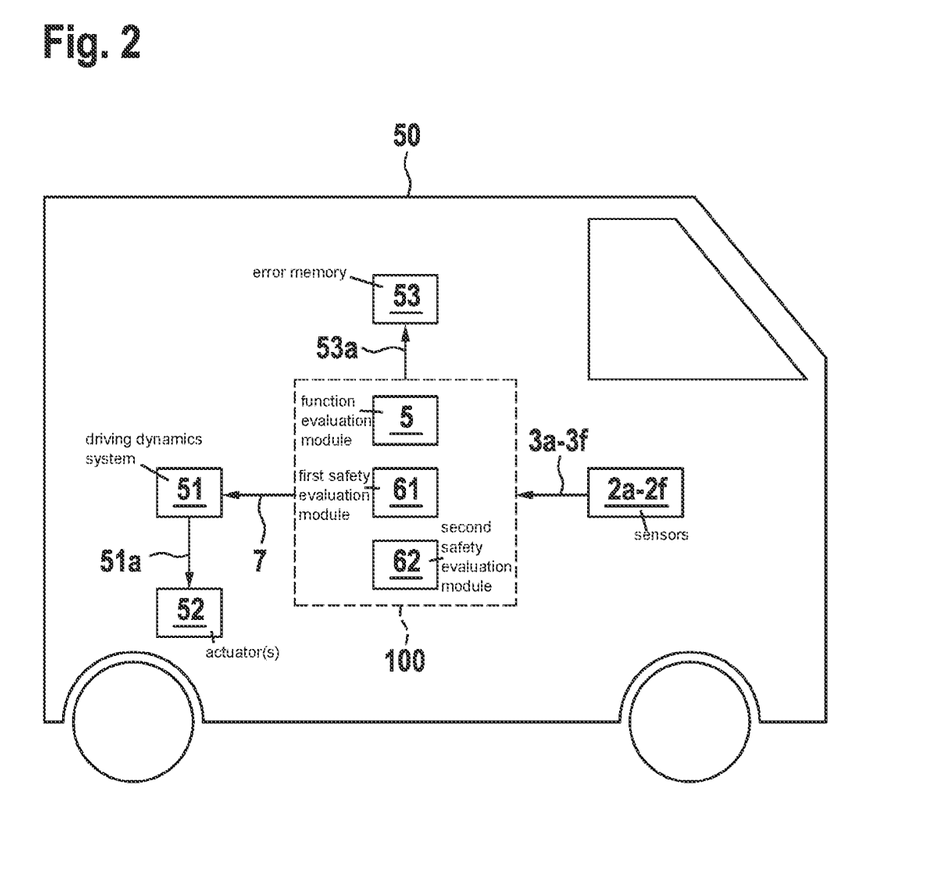
FIG. 2 shows an example of an integration of method 100 in a vehicle 50, in accordance with the present invention.

FIG. 2 shows as an example the integration of method 100 in a vehicle 50. Control signal 7 formed in the context of method 100 is outputted to a driving dynamics system 51. Driving dynamics system 51 for its part translates control signal 7 into an actuating variable 51a that acts on at least one actuator 52 of vehicle 50 and in this way physically acts on the driving dynamic of vehicle 50. Actuating variable 51a can for example represent a drive torque, a steering torque, or a brake cylinder pressure.

If it is constantly required that function evaluation module 5 be overruled by safety evaluation modules 51, 52, then in the context of method 100 an error 53a is outputted to error memory 53 of vehicle 50, in order to prompt the user of vehicle 50 to remedy the problem.

What is claimed is:

1. A method for evaluating measurement data that are obtained by a plurality of sensors through physical observation of a surrounding environment and/or of one or more operating states of a vehicle, for a driving dynamics system that is configured to carry out at least one specified driving task by controlling at least one actuator of the vehicle in an at least partly automated manner, the method comprising the following steps:
    processing, by a function evaluation module, the measurement data originating from sensors of a first group of the plurality of sensors, to form a function signal that, when the function signal is supplied to the driving dynamics system, causes the driving dynamics system to carry out the driving task;
    processing, by a first safety evaluation module, the measurement data originating from a second group of the plurality of sensors, to form a first safety signal that, when the first safety signal is supplied to the driving dynamics system, causes the driving dynamics system to prevent a specified undesired event of the vehicle, the second group containing a proper subset of the first group, wherein the first safety evaluation module is separate from the function evaluation module; and
    aggregating the function signal from the function evaluation module with the first safety signal from the first safety module to form a control signal that is output to the driving dynamics system;
    wherein the aggregating includes a test of whether at least one driving dynamics intervention that takes place when the driving dynamics system is controlled with the first safety signal instead of the function signal, also takes place when the driving dynamics system is controlled with the function signal instead of the first safety signal; and
    wherein, in response to a determination that the driving dynamics intervention takes place when the driving dynamics system is controlled with the first safety signal, but does not take place when the driving dynamics system is controlled with the function signal, the control signal is influenced in such a way that, when the driving dynamics system is controlled with the control signal, the driving dynamics intervention takes place.

2. The method as recited in claim 1, further comprising:
    processing, by a second safety evaluation module, the measurement data originating from sensors of a third group of the plurality of sensor, to form a second safety signal that, when the second safety signal is supplied to the driving dynamics system, causes the driving dynamics system to prevent a specified undesired event of the vehicle, the third group being different from the second group, and the function signal being aggregated with the first safety signal and with the second safety signal to form the control signal that is capable of being output to the driving dynamics system.

3. The method as recited in claim 2, wherein the third group is disjoint from the second group.

4. The method as recited in claim 2, wherein the second group and/or the third group contain at most five sensors.

5. The method as recited in claim 1, wherein the influencing of the control signal is noted in an event memory, and, in response to a condition that a number and/or a temporal sequence of noted events fulfills a prespecified criterion, an error is output to an error memory of the vehicle.

6. The method as recited in claim 1, wherein, in both the function evaluation module and the first safety evaluation module, regions are respectively ascertained in the surrounding environment of the vehicle that are free of specified types of objects.

7. The method as recited in claim 1, wherein, in both the function evaluation module and the first safety evaluation module, regions are respectively ascertained in the surrounding environment of the vehicle that are occupied by specified types of objects.

8. The method as recited in claim 1, wherein the control signal contains a spatial representation of the surrounding environment of the vehicle.

9. The method as recited in claim 1, wherein the undesired event includes a frontal collision of the vehicle, and/or a rear collision against the vehicle, and/or a departure of the vehicle from its lane, and/or a side collision.

10. The method as recited in claim 1, wherein, in the first safety evaluation module, in comparison to the function evaluation module:
the measurement data evaluated is from a smaller spatial region; and/or
the measurement data are evaluated with regard to presence of a more limited class of objects; and/or
objects recognized in the measurement data are evaluated in relation to a more limited class of features.

11. A method for evaluating measurement data that are obtained by a plurality of sensors through physical observation of a surrounding environment and/or of one or more operating states of a vehicle, for a driving dynamics system that is configured to carry out at least one specified driving task by controlling at least one actuator of the vehicle in an at least partly automated manner, the method comprising the following steps:
processing, by a function evaluation module, the measurement data originating from sensors of a first group of the plurality of sensors, to form a function signal that, when the function signal is supplied to the driving dynamics system, causes the driving dynamics system to carry out the driving task;
processing, by a first safety evaluation module, the measurement data originating from a second group of the plurality of sensors, to form a first safety signal that, when the first safety signal is supplied to the driving dynamics system, causes the driving dynamics system to prevent a specified undesired event of the vehicle, the second group containing a proper subset of the first group, wherein the first safety evaluation module is separate from the function evaluation module; and
aggregating the function signal from the function evaluation module with the first safety signal from the first safety module to form a control signal that is output to the driving dynamics system;
wherein the aggregating includes a test of whether all items of information that are used for a determination of a driving dynamics intervention and that are present in the first safety signal are also present in the function signal.

12. The method as recited in claim 11, in which in response to a determination that not all items of information present in the first safety signal for the determination of the driving dynamics intervention are also present in the function signal, the control signal is influenced in such a way that the control signal contains all the items of information.

13. A method for evaluating measurement data that are obtained by a plurality of sensors through physical observation of a surrounding environment and/or of one or more operating states of a vehicle, for a driving dynamics system that is configured to carry out at least one specified driving task by controlling at least one actuator of the vehicle in an at least partly automated manner, the method comprising the following steps:
processing, by a function evaluation module, the measurement data originating from sensors of a first group of the plurality of sensors, to form a function signal that, when the function signal is supplied to the driving dynamics system, causes the driving dynamics system to carry out the driving task;
processing, by a first safety evaluation module, the measurement data originating from a second group of the plurality of sensors, to form a first safety signal that, when the first safety signal is supplied to the driving dynamics system, causes the driving dynamics system to prevent a specified undesired event of the vehicle, the second group containing a proper subset of the first group, wherein the first safety evaluation module is separate from the function evaluation module; and
aggregating the function signal from the function evaluation module with the first safety signal from the first safety module to form a control signal that is output to the driving dynamics system;
wherein the aggregating includes deriving boundary conditions relating to the control signal from the first safety signal, and entering the function signal into the control signal in accordance with the boundary conditions.

14. A non-transitory machine-readable data carrier on which is stored a computer program for evaluating measurement data that are obtained by a plurality of sensors through physical observation of a surrounding environment and/or of one or more operating states of a vehicle, for a driving dynamics system that is configured to carry out at least one specified driving task by controlling at least one actuator of the vehicle in an at least partly automated manner, the computer program, when executed by one or more computers and/or one or more control device and/or one or more embedded system, cause the one or more computers and/or one or more control device and/or one or more embedded system to perform the following steps:
processing, by a function evaluation module, the measurement data originating from sensors of a first group of the plurality of sensors, to form a function signal that, when the function signal is supplied to the driving dynamics system, causes the driving dynamics system to carry out the driving task;
processing, by a first safety evaluation module, the measurement data originating from a second group of the plurality of sensors, to form a first safety signal that, when the first safety signal is supplied to the driving dynamics system, causes the driving dynamics system to prevent a specified undesired event of the vehicle, the second group containing a proper subset of the first group, wherein the first safety evaluation module is separate from the function evaluation module; and
aggregating the function signal with the first safety signal to form a control signal that is capable of being output to the driving dynamics system;
wherein the aggregating includes a test of whether at least one driving dynamics intervention that takes place when the driving dynamics system is controlled with the first safety signal instead of the function signal, also takes place when the driving dynamics system is controlled with the function signal instead of the first safety signal; and
wherein, in response to a determination that the driving dynamics intervention takes place when the driving dynamics system is controlled with the first safety signal, but does not take place when the driving dynamics system is controlled with the function signal, the control signal is influenced in such a way that, when the driving dynamics system is controlled with the control signal, the driving dynamics intervention takes place.

15. A computer and/or a control device and/or an embedded system including hardware configured to evaluate measurement data that are obtained by a plurality of sensors through physical observation of a surrounding environment and/or of one or more operating states of a vehicle, for a driving dynamics system that is configured to carry out at least one specified driving task by controlling at least one actuator of the vehicle in an at least partly automated manner, the computer and/or control device and/or embedded system configured to:

- process, by a function evaluation module, the measurement data originating from sensors of a first group of the plurality of sensors, to form a function signal that, when the function signal is supplied to the driving dynamics system, causes the driving dynamics system to carry out the driving task;
- process, by a first safety evaluation module, the measurement data originating from a second group of the plurality of sensors, to form a first safety signal that, when the first safety signal is supplied to the driving dynamics system, causes the driving dynamics system to prevent a specified undesired event of the vehicle, the second group containing a proper subset of the first group, wherein the first safety evaluation module is separate from the function evaluation module; and
- aggregate the function signal with the first safety signal to form a control signal that is capable of being output to the driving dynamics system;
- wherein the aggregating includes a test of whether at least one driving dynamics intervention that takes place when the driving dynamics system is controlled with the first safety signal instead of the function signal, also takes place when the driving dynamics system is controlled with the function signal instead of the first safety signal; and
- wherein, in response to a determination that the driving dynamics intervention takes place when the driving dynamics system is controlled with the first safety signal, but does not take place when the driving dynamics system is controlled with the function signal, the control signal is influenced in such a way that, when the driving dynamics system is controlled with the control signal, the driving dynamics intervention takes place.

* * * * *